Nov. 17, 1925.

H. WEICHSEL

ALTERNATING CURRENT MOTOR

Filed Nov. 21, 1924

1,561,624

INVENTOR
Hans Weichsel
BY E. E. Huffman
ATTORNEY

Patented Nov. 17, 1925.

1,561,624

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed November 21, 1924. Serial No. 751,243.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description as will enable anyone skilled in the art to which it appertains to make and use the same, reference being had to the accompanying drawings, forming part of this specification.

My invention relates to self-excited synchronous induction motors of the type hereinafter described, and its object is to improve the synchronizing torque of such machines.

Figure 1:
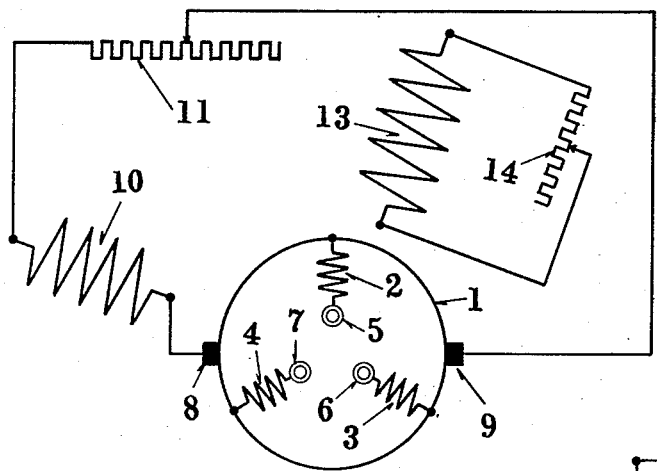
Figure 2:
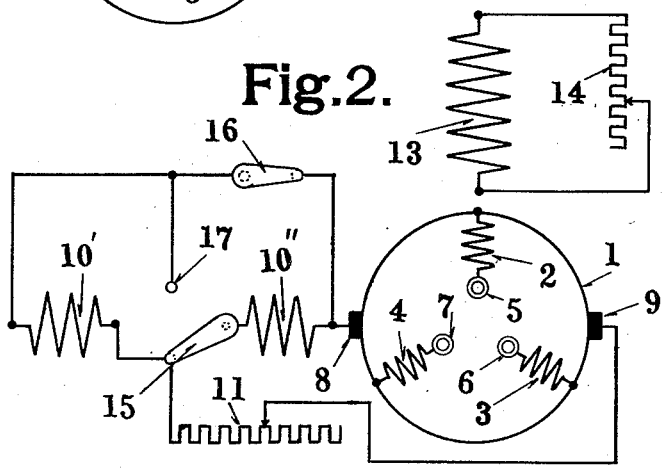
Figure 3:
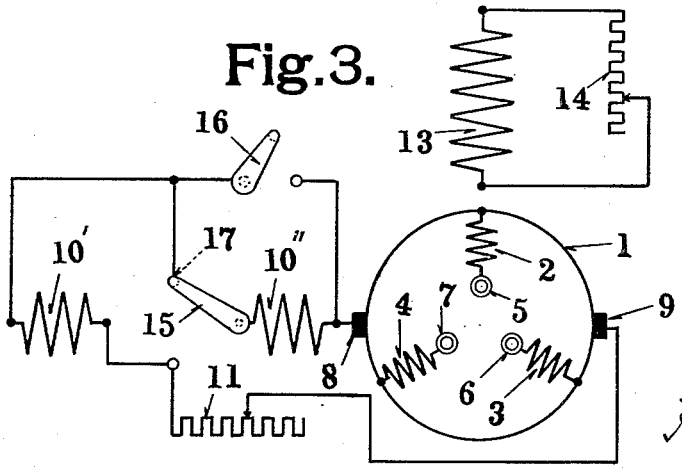

In the accompanying drawings Figure 1 illustrates the type of motor to which my invention relates; Figure 2 a machine of this type embodying my invention and showing the circuit connections for speeds below synchronous; and Figure 3 shows the circuits as reorganized for synchronous operation.

My motor is preferably constructed without defined polar projections on either member and in the form illustrated the primary or inducing member revolves.

Referring first to Figure 1, the primary member carries a commuted winding 1, and a polyphase winding 2, 3 and 4, to which line current is supplied through slip rings 5, 6 and 7. The windings on the primary member are of the "converter" type and the alternating current and direct current winding may be physically independent or combined in any of the known manners. Brushes 8—9 cooperating with the commutator are in circuit with the unidirectional exciting winding 10 on the secondary member through variable resistance 11 and, in the position shown in the drawing, their axis is only slightly displaced from the axis of the winding 10. The secondary member is also provided with a starting winding 13 displaced by 90 electrical degrees from the winding 10 and adapted to be closed over adjustable resistance 14.

In a machine of the type just described the E. M. F. induced in the winding 10 during starting period is of the same frequency as the E. M. F. appearing across the commutator brushes. These E. M. F's. cooperate to produce current through the exciting winding, which current cooperates with the main field in the machine to produce the synchronizing torque. It will be understood that these E. M. F's. will be in phase with each other when the brush axis coincides with the axis of the winding 10 and that although somewhat out of phase in a machine where, for the purpose of securing a magnetizing component during synchronous operation so positioned as to favorably influence the power factor, the winding 10 is slightly displaced from the brush axis, the E. M. F's. referred to, although slightly out of phase, cooperate in the production of the exciting current.

The value of the synchronizing torque in a machine of the type described—a definite relation of brush axis to the axis of the winding 10 being assumed—is a function of the exciting current but in order that the exciting current have the most desirable value during synchronous operation, the desired operating characteristics of the machine determine the dimensions of the winding 10.

In order that a motor of the type described be enabled to synchronize under resistance of loads having high inertia, it is necessary that the synchronizing torque have a high value in relation to the normal or full load, and my invention relates to means whereby the synchronizing torque of a machine, such as shown in Figure 1, may be considerably increased without departing from the dimensions of the winding 10 which are most desirable for synchronous operation. I accomplish the desired result in the manner illustrated in Figure 2 wherein the unidirectional exciting winding in circuit with the commutator is made in two parts 10' and 10". During the starting period I connect these parts in parallel by means of the switches 15 and 16 and associated conductors, as shown in Figure 2, and when synchronous speed has been attained switch 15 is moved to contact 17 and switch 16 opened whereby the parts 10' and 10" of the exciting winding are connected in series.

It will be readily seen that under the parallel connection of Figure 2 the resistance of the exciting winding is reduced to one-fourth of the value under the series connection and without making a corresponding reduction in the total voltage in the exciting circuit, which voltage is the vectorial sum of the voltage induced in this winding and the voltage impressed thereon from the brushes 8—9. Thus the exciting current, and therefore the synchronizing torque, is materially increased. As hereinabove indicated the principle of my invention is applicable both to machines in which the brush axis is displaced from the axis of winding 10 (Figure 1) and to those in which these axes coincide, as in Figures 2 and 3.

During the starting operation the magnitude of the exciting current is suitably adjusted by means of resistance 11.

Having fully described my invention, what I claim as new and desire to secure by Letters Patent of the United States is:

1. In a synchronous motor, the combination of a primary member provided with a commutator, a secondary member provided with a multi-part exciting winding in circuit with the commutator, said parts of the exciting winding being connected in parallel during the starting period, means for connecting said winding parts in series for synchronous operation, and means for supplying alternating current to the primary member.

2. In a synchronous motor, the combination of a primary member provided with converter winding and a commutator and slip rings, a secondary member provided with a multi-part exciting winding in circuit with the commutator, said parts of the exciting winding being connected in parallel during the starting period, means for connecting said winding parts in series for synchronous operation, and means for supplying alternating current to the slip rings.

3. In a synchronous motor, the combination of a primary member provided with a commutator and slip rings, a secondary member provided with a two-part exciting winding and a second winding displaced therefrom and closed on itself, said parts of the exciting winding being connected in parallel during the starting period, and means for connecting said winding parts in series for synchronous operation.

4. In a synchronous motor, the combination of a primary member provided with a commutator and a secondary member provided with a two-part exciting winding in circuit with the commutator, said parts of the exciting winding being connected in parallel during the starting period, means for connecting said winding parts in series for synchronous operation, means for supplying alternating current to the primary member, and an adjustable resistance in series with said exciting winding.

In testimony whereof, I have hereunto set my hand this the 18th day of November, 1924.

HANS WEICHSEL.